(12) United States Patent
Anischenko

(10) Patent No.: US 12,280,963 B2
(45) Date of Patent: Apr. 22, 2025

(54) CONTINUOUS PIPE FEEDER MACHINE WHICH AVOIDS CLAMPING AGAINST WELDED JOINTS OF A PIPE

(71) Applicant: Vasily Anischenko, Lake Zurich, IL (US)

(72) Inventor: Vasily Anischenko, Lake Zurich, IL (US)

(73) Assignee: UNIVERSAL HDD, Lake Zurich, IL (US)

( * ) Notice: Subject to any disclaimer, the term of this patent is extended or adjusted under 35 U.S.C. 154(b) by 101 days.

(21) Appl. No.: 18/199,715

(22) Filed: May 19, 2023

(65) Prior Publication Data

US 2023/0406645 A1    Dec. 21, 2023

Related U.S. Application Data

(60) Provisional application No. 63/344,558, filed on May 21, 2022.

(51) Int. Cl.
| | |
|---|---|
| *F16L 1/20* | (2006.01) |
| *B65G 15/10* | (2006.01) |
| *B65G 15/16* | (2006.01) |
| *B65G 43/08* | (2006.01) |
| *F16L 1/032* | (2006.01) |
| *F16L 1/036* | (2006.01) |

(52) U.S. Cl.
CPC .............. *B65G 43/08* (2013.01); *F16L 1/032* (2013.01); *F16L 1/036* (2013.01); *F16L 1/207* (2013.01); *B65G 2201/0276* (2013.01); *B65G 2203/0208* (2013.01); *B65G 2203/042* (2013.01)

(58) Field of Classification Search
None
See application file for complete search history.

(56) References Cited

U.S. PATENT DOCUMENTS

| | | | |
|---|---|---|---|
| 10,150,622 B1 * | 12/2018 | Wallace | B65G 43/02 |
| 11,054,060 B2 * | 7/2021 | Clapper | F16L 1/10 |
| 11,448,342 B2 * | 9/2022 | Ducceschi | B23K 37/0276 |
| 11,543,054 B2 * | 1/2023 | Clapper | B65G 43/08 |

* cited by examiner

*Primary Examiner* — Kavel Singh
(74) *Attorney, Agent, or Firm* — Justin Lampel

(57) ABSTRACT

A continuous pipe feeder machine which avoids clamping against welded joints of a pipe is provided. The continuous pipe feeder machine is especially suitable for use in pipeline and tunnel construction. The system includes soft pads for moving a pipe. The soft pads of the machine for moving the pipe are located at strategic locations on the machine so that a pipe fed into the machine gets moved without the pads compressing and damaging the welded joints of the pipe.

7 Claims, 6 Drawing Sheets

CONTINUOUS PIPE FEEDER MACHINE WHICH AVOIDS CLAMPING AGAINST WELDED JOINTS OF A PIPE

REFERENCE TO RELATED APPLICATIONS

This application is based on and claims priority to U.S. Provisional Application No. 63/344,558 which was filed on May 21, 2023, the entire contents of which are incorporated by reference herein.

BACKGROUND OF THE INVENTION

A continuous pipe feeder machine which avoids clamping against welded joints of a pipe is provided. The continuous pipe feeder machine is especially suitable for use in pipeline and tunnel construction. The system includes soft pads for moving a pipe. The soft pads of the machine for moving the pipe are located at strategic locations on the machine so that a pipe fed into the machine gets moved without the pads compressing and damaging the welded joints of the pipe. The avoidance of the welded joints between the pipes is achieved as a result of the chain length being substantially identical or identical to the length of the pipe. A precise interval between the pads is organized in such a way that the welded joints are not directly touched by the machine. The position of the interval relative to the welded joint is determined by a sensor at the front of the pipe feeder.

Machines for laying pipes are known. For example, U.S. Pat. No. 8,684,095 to Pullman discloses a pipe setting tool having a tool shaft, a coupler mounted on a first end of the tool shaft, and a tool sleeve affixed to the tool shaft defining a space therebetween. An outside diameter of the tool sleeve ensures close conformity to a borehole to position a geothermal pipe mounted thereto in close proximity to the outside diameter of the borehole, A moveable seal cap may be mounted on the tool shaft, moveable between a first position spaced-apart from the tool sleeve during down-hole movement of the tool to permit fluid flow through the space and a second position against the tool sleeve during up-hole movement of the tool to establish a seal with the tool sleeve to prevent fluid flow through the space. A second end of the tool shaft may receive a pipe book to attach a geothermal pipe to the pipe setting tool.

Further, U.S. Pat. No. 5,314,267 to Osadchuk discloses a horizontal pipeline boring apparatus and method for installing a pipeline section under a surface barrier such as a roadway or the like. A pilot bore is formed under the barrier. Next, a pipeline section bore large enough to received the pipeline section is formed long the path of the pilot bore using a pipeline boring head having a guide on the advancing side thereof. The guide is designed to engage the walls of the pilot bore and steer the pipeline boring head during cutting along the path of the pilot bore. Drilling liquids can be supplied to the boring operation through the pilot bore and discharged through the pipeline section.

However, these patents fail to describe continuous pipe feeder machine which avoids clamping against welded joints of a pipe which is easy to use.

SUMMARY OF THE INVENTION

A continuous pipe feeder machine which avoids clamping against welded joints of a pipe is provided. The continuous pipe feeder machine is especially suitable for use in pipeline and tunnel construction. The system includes soft pads for moving a pipe. The soft pads of the machine for moving the pipe are located at strategic locations on the machine so that a pipe fed into the machine gets moved without the pads compressing and damaging the welded joints of the pipe.

An advantage of the continuous pipe feeder machine which avoids clamping against welded joints of a pipe is that the present device prevents damage to a pipe.

Another advantage of the continuous pipe feeder machine which avoids clamping against welded joints of a pipe is that the present device saves time by not requiring work to stop to fix a damaged pipe.

For a more complete understanding of the above listed features and advantages of the continuous pipe feeder machine which avoids clamping against welded joints of a pipe reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

Figure 1:
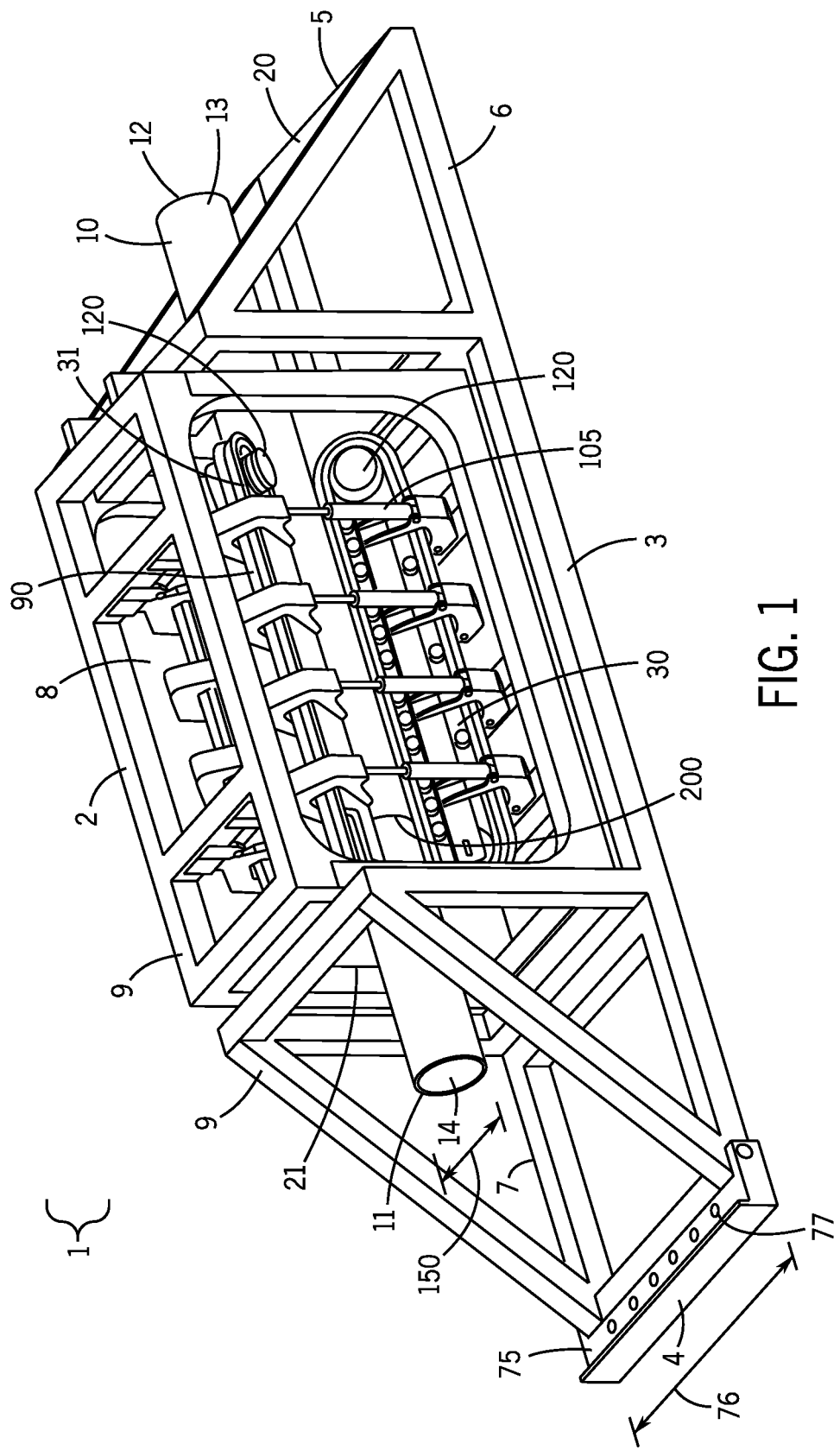
FIG. 1 illustrates a perspective view of the pipe laying machine.

A continuous pipe feeder machine which avoids clamping against welded joints of a pipe is provided. The continuous pipe feeder machine is especially suitable for use in pipeline and tunnel construction. The system includes soft pads for moving a pipe. The soft pads of the machine for moving the pipe are located at strategic locations on the machine so that a pipe fed into the machine gets moved without the pads compressing and damaging the welded joints of the pipe.

Referring now to the figures, a continuous pipe feeder machine 1 is provided. The machine 1 may have a top 2, a bottom 3, a front 4, a back 5, a first side 6, a second side 7 and an interior cavity 8. The machine 1 may have a series of support frames 9 which from the housing of the machine 1. The interior cavity 8 has a first opening 20 at the back 5 of the machine 1 and a second opening 21 at the front 4 of the machine 1; wherein a hollow passageway extends from the first opening 20 to the second opening 21. The machine 1 is preferably made at least of a partially durable material such as metal. The machine 1 is especially suitable for laying a pipe 10. In particular, the machine 1 is suitable for laying a, for example, water, gas or other utility pipe 10 in the ground.

The pipe 10 may have a first end 11, a second end 12, a preferably cylindrical side 13 and an interior 14. During use, the first end 11 of the pipe 10 is fed into the back 5 of the machine 1. More specifically, the first end 11 of the pipe 10 is fed into the first opening 20 of the back 5 of the machine 1 so that the pipe 10 enters the interior 8 of the machine 1 and passes out of the second opening 21 at the front 4 of the machine 1.

In an embodiment, the interior 8 of the machine 1 has a plurality of tracks 30. The number of tracks 30 on the first side 3 of the machine 1 is generally equal to the number of tracks 30 on the second side 4 of the machine 1. The tracks 30 are located within the interior 8 of the machine 1, within the hollow passageway between the first opening 20 and the second opening 21. The figures illustrate two tracks 30 on the first side 3 of the machine 1 (one toward the top and toward the bottom); however, the number of tracks 30 used in the machine 1 may vary. Generally, the same configuration of tracks 30 would be at the second side 7 of the machine interior 8 as well (but not visible in FIG. 1).

In one embodiment, located at the first end 4 of the machine 1 is a front foot 75. The front foot 75 may have a length 76 which is substantially equal to or identical to a width of the main body of the machine 1. The front foot 75 may have a plurality of holes 77 which receive securing devices (such as bolts, screw or the like) to secure the machine 1 to the ground and to prevent the movement of the machine 1 during use.

Figure 2:
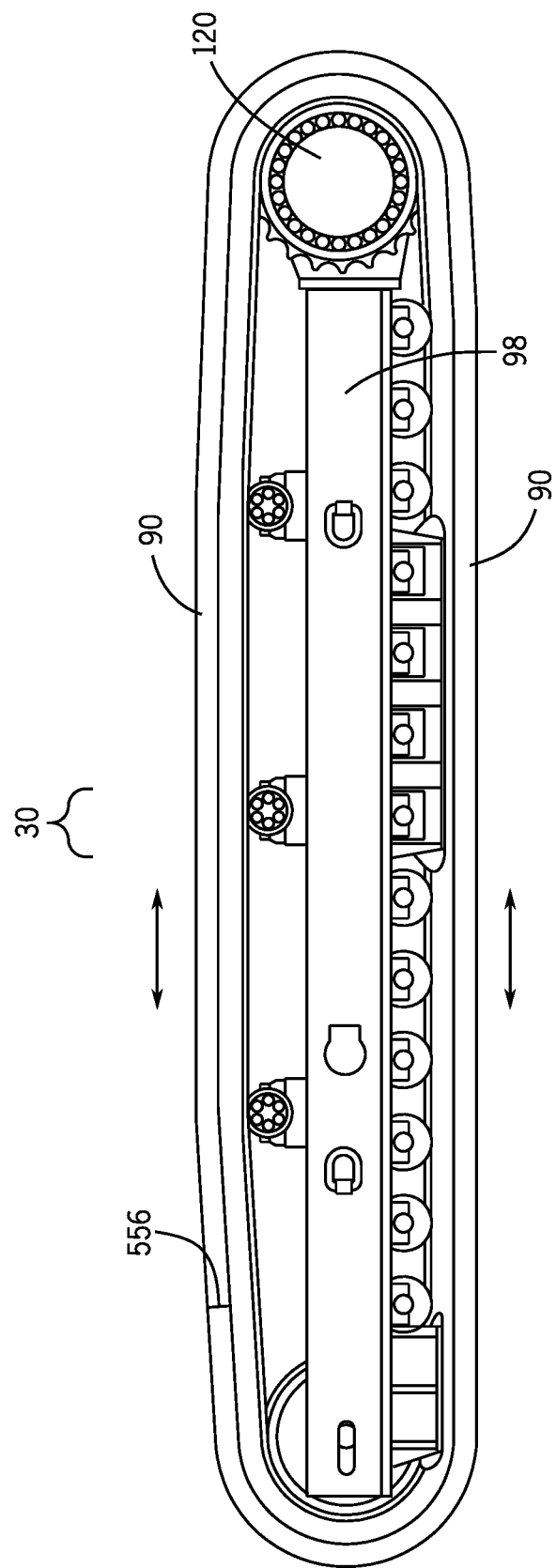
FIG. 2 illustrates a side view of the tracks of the pipe laying machine.

In an embodiment, each of the tracks 30 may have its own soft pad belt portion 90. The soft pad belt 90 may resemble a padded belt which surrounds the perimeter of the track 30, as best shown in FIG. 2. The soft pad belt 90 may be the portion of the machine 1 that moves the pipe 10 through the machine 1 for ultimate placement of the pipe 10. In particular, the soft pad belt 90 may be the portion of the machine 1 that actually makes contact with the pipe 10. As the main body frame 98 of the tracks 30 remains stationary, the rotary drive 120 rotates and moves the soft pad belt 90 of the machine 1 (as discussed further below). More specifically, the soft pad belt 90 moves around the track main body frame 98 in a similar manner as a track of a tank.

The tracks 30 of the machine 1 may be forced up against the pipe 10 (with the soft pad belts 90 actually touching the pipe 10). Opposing tracks 30 near the top, the bottom and sides of the interior 8 of the machine 1 may grasp the pipe 10 and apply pressure to the pipe 10 to hold the pipe 10 within the interior 8 of the machine 1.

In an embodiment, vertical support cylinders 105 attached to the machine 1 housing frame 9 force the tracks 30 (and therefore soft pad belts 90) against the pipe 10. The vertical support cylinders 105 may be hydraulically powered in one embodiment. The vertical support cylinders 105 may move inward or outward with respect to the interior 8 of the machine 1 depending on the diameter 150 of the pipe 10. To release the pipe 10 from the machine 1, the vertical support cylinders 105 pull back from the pipe 10, releasing the pressure on the pipe 10.

A rotary drive 120 connected to the tracks 30 may move the soft pad belts 90 of the tracks 30. In particular, the front face 31 of each of the tracks 30 may have the rotary drive 120. As a result of the rotary drive 120 moving the soft pad belts 90 of the tracks 30 which are pressed against the pipe 10, the pipe 10 moves in the desired direction (either forward or backward through the machine 1).

Typical pipes used in connection with this (and similar machines) have welded portions 200. In particular, multiple shorter pipes are welded 200 together to form a longer pipe. The present machine 1 is unique in how it moves the pipe 10 through a pipe feeding machine. In particular, the total length 555 of the soft pad belts 90 of the present machine 1 is precisely equal to the length 400 of the pipe 10 so that as the pipe 10 moves through the interior 8 of the machine 1 the seam 556 of the soft pad belts 90 never make direct contact with the welds 200 of the pipe 10 provided that as the pipe 10 is first inserted into the machine 1 that the seam 556 of the soft belt 90 does not align with the weld 200 of the pipe 10. As a result, the welds 200 of the pipe 10 remain untouched and, therefore, stronger; allowing the effective life of the finished pipe is extended.

In an embodiment, the tracks 30 may be moved within the interior 8 of the machine 1 so that the operator may adjust the intervals between the soft pad belts 90 equals the precise length 400 of whatever length pipe 10 is fed into the machine 1. As a result, the present machine 1 may be used with pipes 10 of different lengths.

Figure 3:
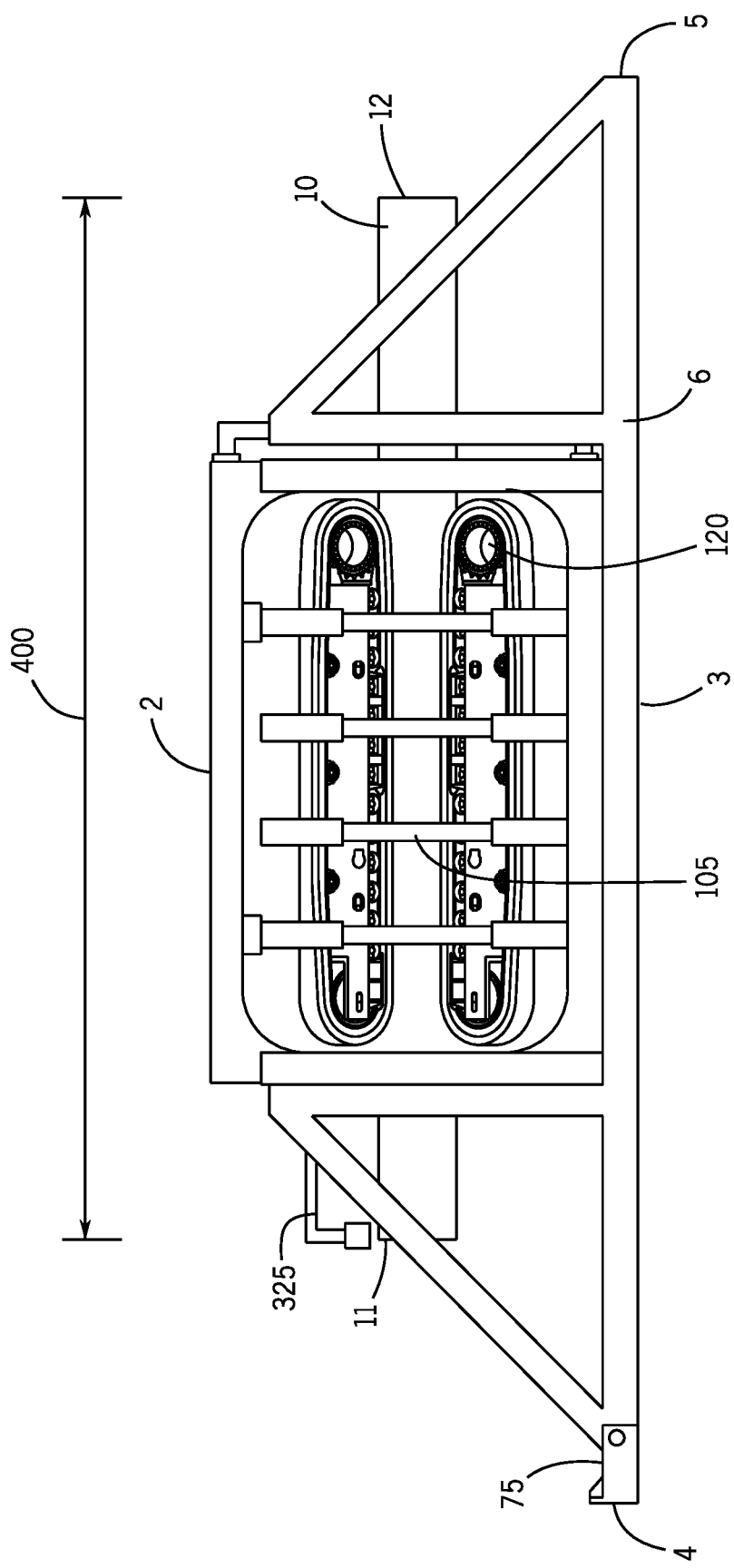
FIG. 3 illustrates a side view of the feeder with a welded joint finding sensor.
Figure 4:
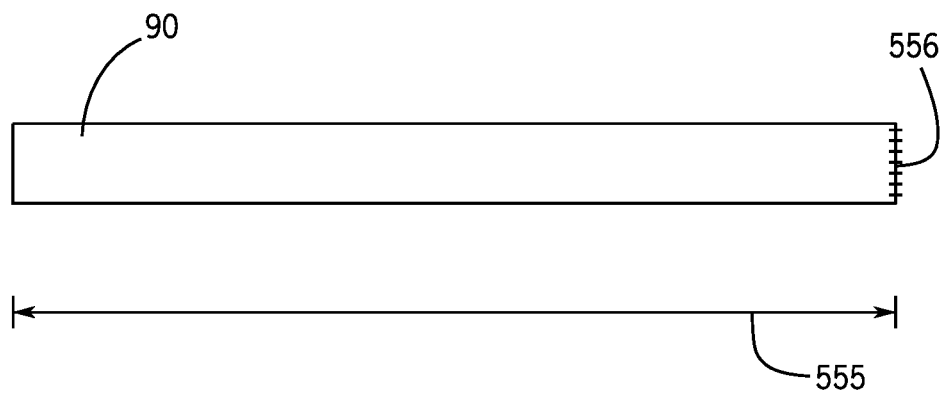
FIG. 4 illustrates a view of the soft pad belt removed from the machine and laid out in a flat configuration (unlike the continuous configuration shown in actual use on the machine in FIG. 1).
Figure 5:
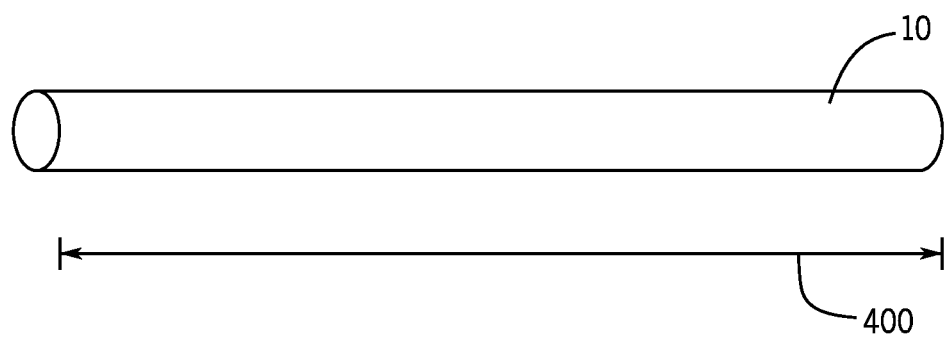
FIG. 5 illustrates a side view of a pipe which is inserted into the machine.
Figure 6:
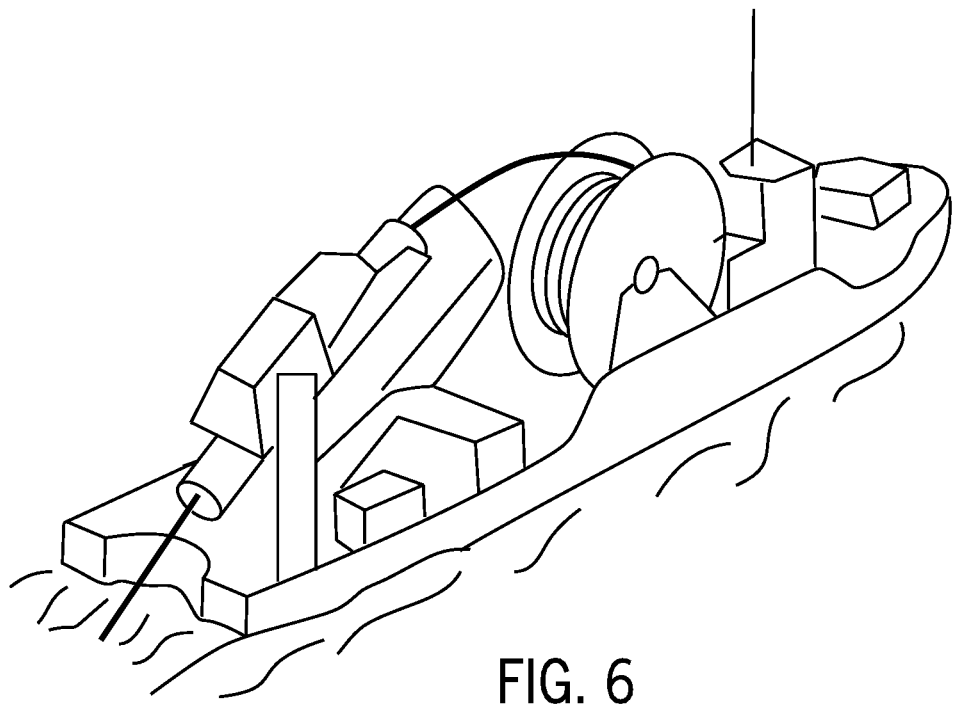
FIG. 6 illustrates a prior art pipe laying machine as used on a ship.
Figure 7:
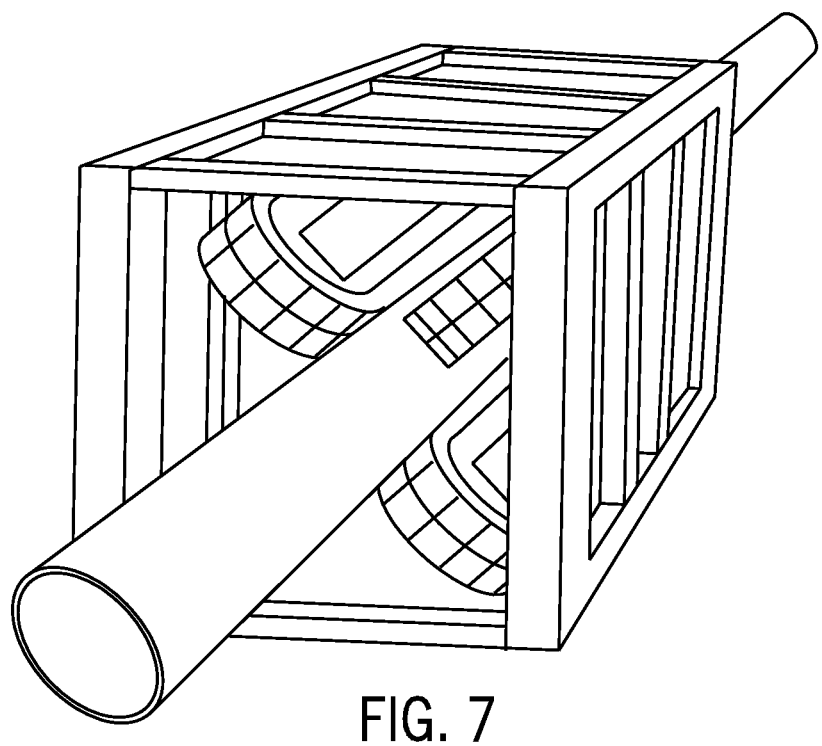
FIG. 7 illustrates a common prior art pipe laying machine.
Figure 8:
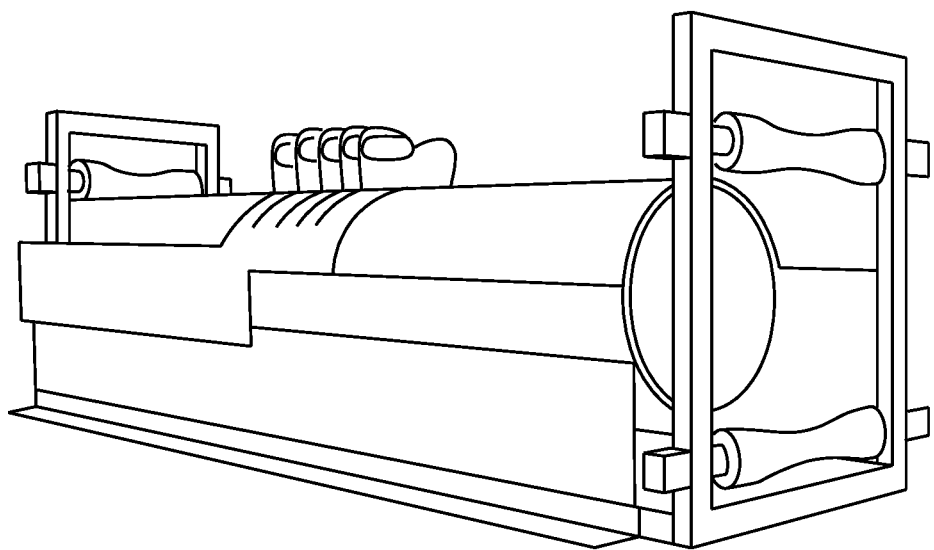
FIG. 8 illustrates a common prior art pipe laying machine.
Figure 9:
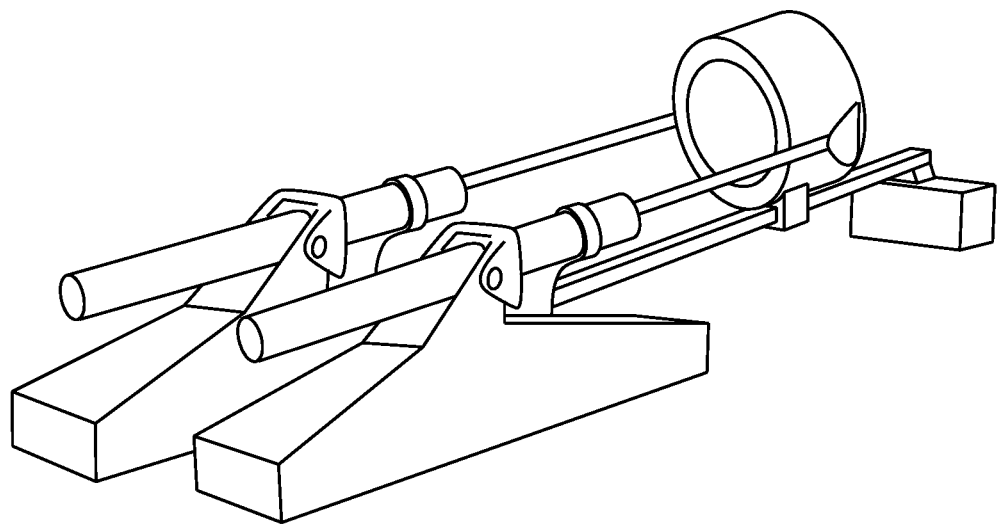
FIG. 9 illustrates a common prior art pipe laying machine.

A sensor 325 may be used in connection with the machine 1 to ensure that the welds 200 of the pipe 10 are properly protected. The sensor 325 may use: 1) color (the protection coating or coupling of the welds 200 of the pipe 10 generally has a different color than the remainder of the pipe 10) and/or 2) elevation (the welds 200 of the pipe 10 are always higher off the surface of the pipe 10, so mechanical, high precision proximity or laser-based sensors 325 can detect the approaching welds 200 of the pipe 10 and alter the pads 90 to avoid the seams 556 of the pads 90 from touching the welds 200 of the pipe 10). In some embodiments, the machine 1 may have ultrasound sensors 325 which measure the thickness of steel to detect a weld 200 joint of the pipe 10 (the pipe would have a different thickness at the welds). Optical, inductive, RFID, QR code sensors 325 may also react to a sticker on the pipe 10 surface which is applied so that the machine 1 avoids having the seams 556 of the pads 90 from touching the welds 200 of the pipe 10. While FIG. 3 shows the sensor 325 only at one end of the machine 1 for illustrative purposes, the machine 1 may have multiple sensors 325 at various locations on, within, and around the machine 1. The sensor 325 locates the weld 200 of the pipe 10 and transmits information about the location of the weld 200 to the rotary drive 120 of the tracks 30 so as move the pads 90 in a manner so that the seam 556 of the pad 90 does not align with and/or contact the weld 200 of the pipe 10.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A pipe feeder machine for moving a pipe comprising:
   a housing having a frame wherein the frame has a front, a back, a first side, a second side, a top, a bottom and an interior;
   a passageway extending completely through the interior of the frame of the housing wherein the passageway receives a pipe;
   at least one track within the interior of the frame wherein the track has a pad and wherein the pad rotates around the track;
   wherein the pad has a length when laid out in a flat orientation;
   a rotary element for rotating the pad around the track; and
   and wherein a length of the pad in the flat orientation is identical to a length of the entire pipe.

2. The pipe feeder machine for moving a pipe of claim 1 further comprising:

a sensor attached to the frame wherein the sensor locates a weld on a pipe and transmits instructions to the rotary element to control the pad of the machine in relation to the weld.

3. The pipe feeder machine for moving a pipe of claim 2 wherein the sensor detects different colors on the pipe and sends instructions to the rotary element to control the pad of the machine in relation to the weld of the pipe.

4. The pipe feeder machine for moving a pipe of claim 2 wherein the sensor detects variations in a thickness of the pipe and sends instructions to the rotary element to control the pad of the machine in relation to the weld of the pipe.

5. The pipe feeder machine for moving a pipe of claim 2 wherein the sensor detects a RFID or QR code on the pipe and sends instructions to the rotary element to control the pad of the machine in relation to the weld of the pipe.

6. The pipe feeder machine for moving a pipe of claim 1 further comprising:
a front foot of the frame of the housing.

7. The pipe feeder machine for moving a pipe of claim 6 further comprising:
at least one opening in the front foot wherein the opening receives a securing device to secure the machine.

\* \* \* \* \*